J. R. LEEMING.
NUT LOCK.
APPLICATION FILED DEC. 27, 1913.
1,128,335.
Patented Feb. 16, 1915.
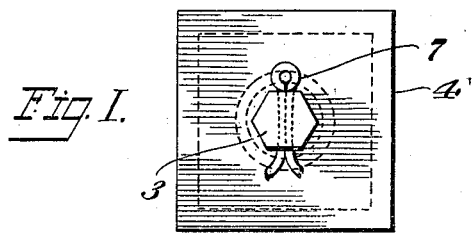
Fig. I.
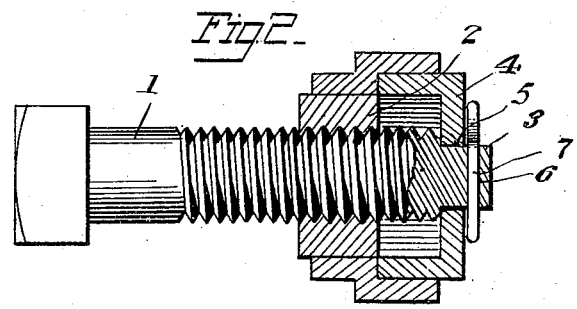
Fig. 2.
Witnesses
Frederic W. Ely.
J. J. McCarthy
Inventor
J. R. Leeming
By Victor J. Evans
Attorney

UNITED STATES PATENT OFFICE.

JOHN R. LEEMING, OF SOMERSET, COLORADO.

NUT-LOCK.

1,128,335. Specification of Letters Patent. Patented Feb. 16, 1915.

Application filed December 27, 1913. Serial No. 809,050.

*To all whom it may concern:*

Be it known that I, JOHN R. LEEMING, a subject of the King of Great Britain, residing at Somerset, in the county of Gunnison and State of Colorado, have invented new and useful Improvements in Nut-Locks, of which the following is a specification.

This invention relates to certain novel and useful improvements in nut locks.

In carrying out the present invention, it is my purpose to provide a device for locking the nuts on the shanks of bolts which will embody among other features a cap secured to the threaded end of the shank of the bolt and a sleeve carried by the cap and inclosing the nut to hold the latter against movement on the shank of the bolt when such nut is out of the range of the cap.

With the above and other objects in view, the invention consists in the construction, combination and arrangement of parts hereinafter set forth in and falling within the scope of the claims.

In the accompanying drawing: Figure 1 is a view in end elevation of a bolt and nut thereon showing my invention applied. Fig. 2 is a longitudinal sectional view through the same.

Referring now to the accompanying drawing in detail, 1 designates a bolt, while 2 indicates a nut threaded onto the shank of the bolt. Extending outwardly from the threaded end of the bolt and coaxial therewith is a non-circular stem 3. This stem may be square, octagonal or any polygonal shape in cross section.

4 designates a cap of substantially cup shape having an aperture 5 formed in the bottom wall thereof and designed to receive the stem 3, such aperture being of a configuration corresponding to that of the stem. In order to prevent accidental displacement of the cap from the stem, the latter is formed with a transverse passage 6 within which is disposed a cotter pin 7 or other form of key.

In order to lock the nut on the bolt, I employ a holder 8 in the form of a sleeve designed to inclose the nut and interposed between the edge of the flange of the cap and the work through which the bolt is passed. In the present instance, the supplemental holder 8 has a flange surrounding the nut and of a configuration corresponding to that of the nut, and a flange offset from the first flange and surrounding the side wall of the cap 4 and of a shape corresponding to that of the side wall of such cap, as clearly illustrated in Fig. 2 of the drawing.

From the foregoing description taken in connection with the accompanying drawing, the construction and manner of employing my invention will be readily apparent.

It will be seen that I have provided a nut lock whereby the nut will be securely held to the bolt and wherein mutilation of the threads of the bolt or nut is avoided.

I claim:

1. In a nut lock, the combination with a bolt and nut thereon, of a cap secured to the threaded end of said bolt, and a holder comprising a sleeve carried by the cap and projecting forwardly thereof and inclosing the nut to hold the latter upon the bolt.

2. In a nut lock, the combination with a bolt and nut thereon, of a non-circular stem secured to the threaded end of the bolt and coaxial therewith, a cap upon said stem and incasing said bolt, means for holding said cap on the stem, and a holder coöperating with the cap and inclosing the nut to hold the latter on the bolt, said supplemental holder having a flange surrounding the nut and conforming to the shape thereof and a flange offset from the first flange and surrounding the side wall of the cap and of a configuration corresponding to that of the cap.

In testimony whereof I affix my signature in presence of two witnesses.

JOHN R. LEEMING.

Witnesses:
  GEO. McDERMEID,
  L. PETERSEN.

Copies of this patent may be obtained for five cents each, by addressing the "Commissioner of Patents, Washington, D. C."